United States Patent
Curtis et al.

(10) Patent No.: US 6,759,603 B2
(45) Date of Patent: Jul. 6, 2004

(54) WEIGHT SENSOR ASSEMBLY WITH OVERLOAD SPRING

(75) Inventors: Brian M. Curtis, Lake Orion, MI (US); Jeffrey A. Clark, Sterling Heights, MI (US)

(73) Assignee: Siemens VDO Automotive Corporation, Auburn Hills, MI (US)

( * ) Notice: Subject to any disclaimer, the term of this patent is extended or adjusted under 35 U.S.C. 154(b) by 216 days.

(21) Appl. No.: 09/992,498

(22) Filed: Nov. 6, 2001

(65) Prior Publication Data

US 2002/0062998 A1 May 30, 2002

Related U.S. Application Data

(60) Provisional application No. 60/250,394, filed on Nov. 28, 2000.

(51) Int. Cl.[7] .................. G01G 19/52; G01G 21/00; B60R 21/32
(52) U.S. Cl. ................. 177/144; 177/184; 177/DIG. 9; 180/273; 280/735; 73/768
(58) Field of Search ................... 280/735; 180/273; 701/45; 73/768; 340/667; 177/136, 144, 210 R, 154–159, 184–189, DIG. 9

(56) References Cited

U.S. PATENT DOCUMENTS

| | | | | |
|---|---|---|---|---|
| 3,022,976 A | | 2/1962 | Zia ............................. | 248/340 |
| 4,095,659 A | * | 1/1978 | Blench et al. ............... | 177/136 |
| 4,726,435 A | * | 2/1988 | Kitagawa et al. ........... | 177/187 |
| 5,232,243 A | | 8/1993 | Blackburn ................... | 280/735 |
| 5,600,104 A | * | 2/1997 | McCauley et al. .......... | 177/136 |
| 5,810,392 A | | 9/1998 | Gagnon ....................... | 280/735 |
| 5,942,695 A | | 8/1999 | Verma ......................... | 73/768 |
| 5,971,432 A | | 10/1999 | Gagnon et al. ............. | 280/735 |
| 6,039,344 A | | 3/2000 | Mehney et al. ............. | 280/735 |
| 6,069,325 A | | 5/2000 | Aoki ........................... | 177/136 |
| 6,092,838 A | | 7/2000 | Walker ........................ | 280/735 |
| 6,323,443 B1 | * | 11/2001 | Aoki et al. .................. | 177/144 |
| 6,407,347 B1 | * | 6/2002 | Blakesley .................... | 177/144 |
| 6,448,512 B1 | * | 9/2002 | Cooper ........................ | 177/144 |

FOREIGN PATENT DOCUMENTS

| | | |
|---|---|---|
| DE | 10011371 A1 | 9/2000 |
| DE | 20012950 U1 | 11/2000 |
| EP | 962362 A2 | 12/1999 |
| WO | WO 98/22920 A1 | 5/1998 |
| WO | WO 99/24285 | 5/1999 |
| WO | WO 00/50255 A1 | 8/2000 |

OTHER PUBLICATIONS

Research Disclosure, Jul. 1997.
International Search Report, dated Jul. 17, 2002.

* cited by examiner

*Primary Examiner*—Randy W. Gibson

(57) ABSTRACT

A vehicle seat assembly 12 is mounted to a vehicle base member 24 such as a riser or a vehicle floor. Weight sensor assemblies 32 for measuring weight on the vehicle seat are mounted to a seat structural component. The weight sensor assemblies 32 each include plate 44 having a bendable center body portion 46 for supporting a strain gage 48. The strain gage 48 measures bending in the center body portion 46 caused by normal weight force applications on the vehicle seat 12. A secondary resilient beam member 34 is mounted between each weight sensor 32 and the vehicle base member 24. The beam member 34 and the weight sensors 32 deflect to prevent failure of the weight sensors 32 in response to an overload force applied in an opposite direction to the direction of a normal weight force application. The beam member 34 prevents permanent deformation of the plate 44 and strain gage failure by allowing the weight sensor 32 to deflect upwardly away from the vehicle floor. An overload stop 68 reacts between the seat structural component and the vehicle floor to prevent seat separation under overload conditions.

19 Claims, 3 Drawing Sheets

WEIGHT SENSOR ASSEMBLY WITH OVERLOAD SPRING

RELATED APPLICATION

This application claims priority to provisional application 60/250,394 filed on Nov. 28, 2000.

BACKGROUND OF THE INVENTION

1. Field of the Invention

This invention relates to a sensor assembly for measuring the weight applied to a vehicle seat.

2. Related Art

Most vehicles include safety devices such as airbags and seatbelt restraint systems, which work together to protect the driver and passengers from experiencing serious injuries due to high-speed collisions. It is important to control the deployment force of the airbags based on the size of the driver or the passenger. When an adult is seated on the vehicle seat, the airbag should be deployed in a normal manner. If there is an infant seat or small adult/child secured to the vehicle seat then the airbag should not be deployed or should be deployed at a significantly lower deployment force. One way to control the airbag deployment is to monitor the weight of the seat occupant.

One system for measuring seat occupant mounts sensors between various structural components on a vehicle seat, such as between an upper seat structural component and a seat riser or the vehicle floor. The sensors are load cells that have a strain gage mounted on a bendable or deflectable body portion that measures the amount of strain in the deflectable body portion resulting from a weight force being exerted on the vehicle seat. The strain measurements from each of the sensors are combined to determine the total weight of the seat occupant.

The system also includes an overload stop formed within the upper seat structural component, which prevents the seat from separating from the vehicle floor or riser under an overload condition. For example, during a high-speed collision, the weight of a seat occupant secured to the seat with a seatbelt exerts an upward force on upper seat structural components. This upward force can cause the seat to separate from the vehicle floor. The overload stop is designed into the seat structural components to prevent this from happening. The overload stop includes a fastener that has one end attached to the vehicle floor with the opposite end having an enlarged head portion extending into the upper structural component of the seat. A predetermined gap is maintained between the bottom of the structural component and the head portion of the fastener. When an overload force is applied, the seat tries to pull away from the floor causing the structural component to move upwardly into engagement with the head portion of the fastener. The enlarged head portion of the fastener prevents the structural component from separating from the floor.

One disadvantage with the current system is that during an overload condition, the bendable body portion can plastically deform or break, resulting in permanent damage to the sensor assembly. To minimize the occurrence of this problem, the predetermined gap size must be very small, i.e., less than two millimeters. This small gap size is difficult achieve and maintain due to dimensional tolerance stack-ups resulting from the assembly of various different components.

Another disadvantage with the current system is that due to the structural mounting configurations and requirements for overload protection in seat assemblies, it is difficult to provide adequate strength for the body portion of the sensor while also providing accurate strain measurements at the lower strain ranges. In other words, because the sensor assemblies are connecting elements between the seat frame member and seat track member, the sensor assemblies must be strong and durable enough to provide secure connection point within the seat assembly but must also be able to provide a sufficient amount of bending/deflection so that the strain gages can measure strain accurately over a wide range of occupant sizes.

Thus, it is desirable to have an improved seat occupant weight measurement system that provides adequate strength, overload protection, and increased accuracy as well as overcoming any other of the above referenced deficiencies with prior art systems.

SUMMARY OF THE INVENTION

Weight sensor assemblies for measuring a normal weight force applied to a vehicle seat are installed between an upper seat structure and a vehicle base member such as a riser or vehicle floor. Each sensor assembly includes a plate with a first mount for mounting the beam to the upper seat structure, a second mount for mounting the beam to the vehicle base member, and a center body portion extending between the first and second mounts that exhibits bending behavior during normal weight force applications. A resilient beam member is mounted between each weight sensor assembly and the vehicle base member to prevent sensor failure during an overload force application in a direction opposite to that of a normal weight force application. A strain gage is mounted on the plate at the center body portion to measure the strain caused by the bending. The strain measurements are transmitted to a central processing unit that determines the total weight. The processing unit generates a control signal for a safety device based on the weight determination.

In the preferred embodiment, the resilient beam member is a spring having one end mounted to the vehicle base member and an opposite end mounted to the plate with a spring body portion extending between the first and second spring ends. The spring body portion is spaced apart from the center body portion of the plate to define a gap. There is also a gap between the center body portion of the plate and the upper seat structure. This allows the plate to exhibit S-shaped bending with one portion of the plate being in tension and another portion being in compression.

An overload stop reacts between the vehicle base member and the upper seat structure to prevent seat separation from the vehicle floor during the application of an overload force. The overload stop includes a fastener that is attached at one end to the vehicle floor with an opposite end extending into an opening in the upper seat structure. The fastener includes an enlarged head portion of greater size than the opening that engages the supper seat structure during the application of an overload force.

These and other features of the present invention can be best understood from the following specification and drawings, the following of which is a brief description.

DETAILED DESCRIPTION OF AN EXEMPLARY EMBODIMENT

Figure 1:
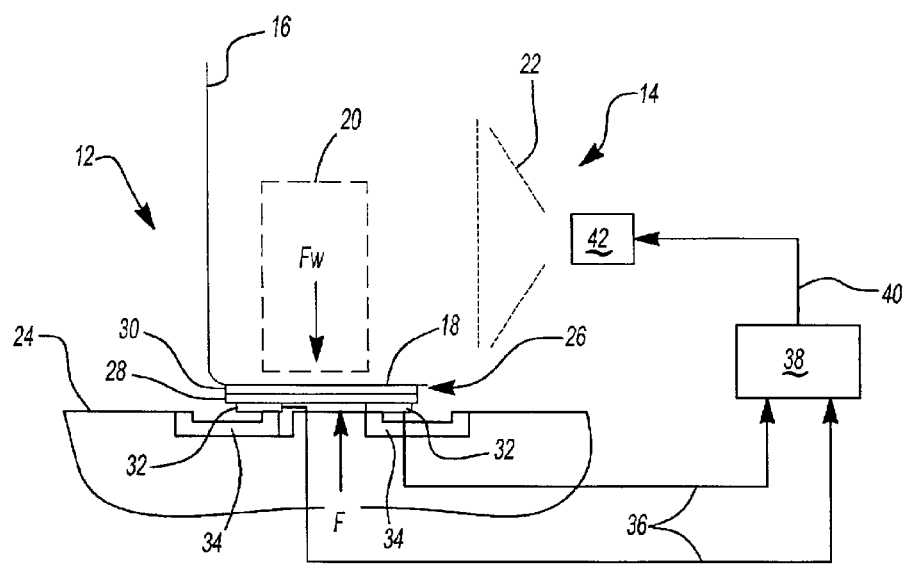
FIG. 1 is a schematic side view showing a vehicle with an airbag system and an occupant sitting in a seat with the airbag in an active state shown in dashed lines.

A vehicle includes a vehicle seat assembly, shown generally at 12 in FIG. 1, and an airbag system 14. The seat assembly 12 can be either a driver or passenger seat and includes a seat back 16 and a seat bottom 18. When a vehicle occupant 20 is seated on the seat 12 a weight force Fw is exerted against the seat bottom 18. The weight force Fw represents the weight of the seat occupant 20. The seat occupant 20 can be a large adult, a small adult, a child, an infant seat, or some type of package or other object.

The airbag system 14 deploys an airbag 22 under certain collision conditions. The deployment force for the airbag 22, shown in dashed lines in FIG. 1, varies according to the weight of the occupant 20. The vehicle includes a unique system for measuring the weight of the seat occupant 20, which includes overload protection.

The seat 12 is preferably mounted to vehicle base member 24 such as a riser or vehicle floor with a track assembly 26 to allow horizontal seat adjustment. The track assembly 26 includes an inboard track assembly and an outboard track assembly that is spaced apart from the inboard track assembly by a predetermined distance. Both the inboard and outboard track assemblies 26 include first 28 and second 30 track members. The first track member 28 is typically mounted to the base member 24. The second track member 30 is mounted for sliding movement relative to the first track member 28 so that seat 12 position can be adjusted forwardly and rearwardly within the vehicle to a desired position.

A plurality of load cell sensor assemblies 32 are mounted to the first track members 28. In the preferred embodiment, four (4) sensor assemblies 32 are used at each of the four (4) connecting points between the first tracks 28 and the base member 24. To provide overload protection, a resilient beam member 34 is installed between each of the sensor assemblies 32 and the base member 24. Overload protection is required to prevent seat separation. During a high-speed collision, the weight of a seat occupant 20 secured to the seat with a seatbelt exerts an upward force F on the seat assembly 12. This upward force F can cause the seat 12 to separate from the vehicle floor 24. Overload protection is designed into the seat structural components to prevent this from happening.

The weight sensor assemblies generate weight signals 36 that are sent to a central processing unit (CPU), electronic control unit (ECU) or other similar device 38 which determines the weight of the seat occupant 20 based on the weight signals 36. Once the weight is known, the ECU 38 generates a control signal 40 that is sent to a safety device controller 42 to control deployment of a safety device, such as the airbag 22 for example.

Figure 2:
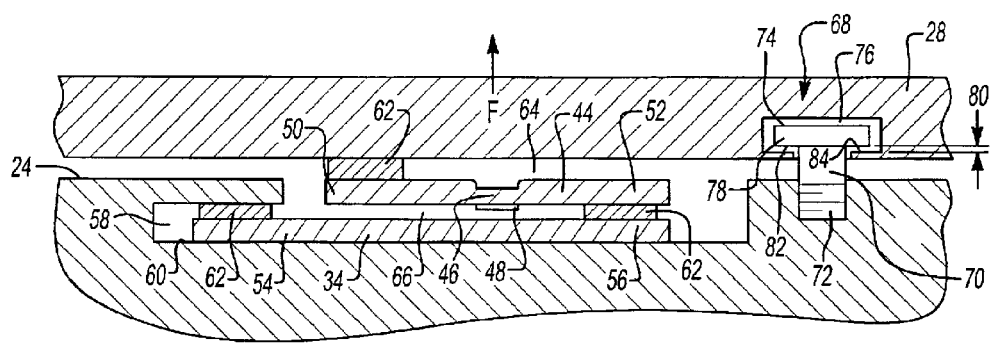
FIG. 2 is a side view in partial cross-section of a weight sensor assembly and overload stop during normal operation.

A cross-sectional view of one of the weight sensor assemblies 32 and beam members 34 is shown in FIG. 2. The weight sensor assemblies each include a plate 44 that has a center body portion 46 that supports a strain gage assembly 48. The strain gage assembly 48 is preferably a full-bridge strain gage that operates as a Wheatstone Bridge. The strain gage assembly 48 measures the bending that occurs in the center body portion 46 as a result of a normal weight force application to the seat bottom 18. The plate 44 has a first end 50 that attaches to the first track 28 and a second end 52 that attaches to the beam member 34. The center body portion 46 extends between the first 50 and second 52 ends.

Preferably, the beam member 34 is a spring element having a first spring end 54 attached to the base member 24 and a second spring end 56 attached to the second end 52 of the plate 44. A recess 58 is formed within the base member 24 that extends underneath the sensor assembly 32. The recess 58 has a bottom support surface 60 on which the beam member 34 rests during normal weight force applications. The support surface 60 prevents the beam member 34 from deflecting downwardly to provide S-shaped bending in the center body portion 46 due to a normal weight force application. The S-shaped bending causes one portion of the plate 44 to be in compression and another part of the plate 44 to be in tension.

Fasteners 62 are used to connect the plate 44 to the first track 28 and beam member 34 and to connect the beam member 34 to the vehicle base member 24. Any type of fastener known in the art could be used including rivets, bolts, screws, etc., for example.

The fasteners 62 are installed to provide gaps between the track assembly 26 and plate 44 and between the plate 44 and beam member 34 to allow for sufficient bending/deflection. A first gap 64 is formed between the first track 28 and the center body portion 46 of the plate 44 and a second gap 66 is formed between the center body portion 46 and the beam member 34.

The system also includes an overload stop, indicated generally at 68. The overload stop 68 includes a fastener element 70 that has one end 72 attached to the base member 24 and an opposite end 74 that extends upwardly into the track assembly 26. The first track 28 includes an opening 76 having a predetermined size. The fastener element 70 has an enlarged head portion 78 that is greater in size than the opening 76 in the first track 28. During normal weight force applications, a gap 80 is formed between a bottom surface 82 of the head portion 78 and a track surface 84 of the first track 84. Preferably this gap 80 is at least three (3) millimeters.

Figure 3:
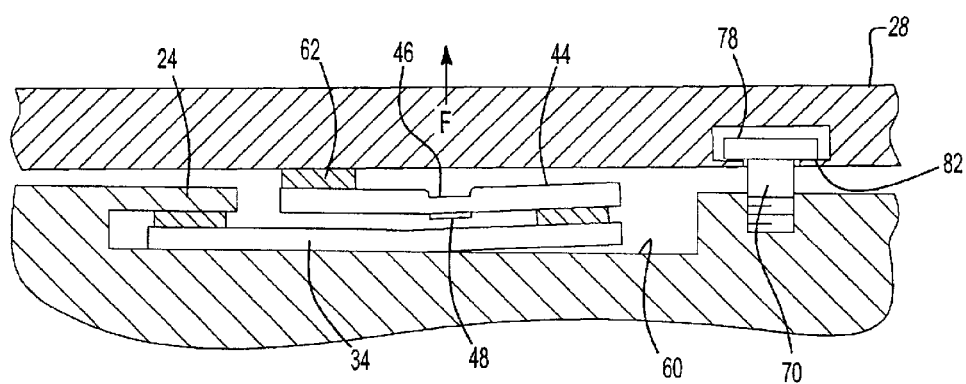
FIG. 3 is a view similar to FIG. 2 but showing the overload stop in an overload force application.

When an overload force F is exerted upwardly on the track assembly 26 the beam member 34 deflects upwardly more than the bendable center portion 46 of the plate 44. This allows the track surface 84 to engage the bottom surface 82 of the head portion 78, as shown in FIG. 3, to stop the track assembly 26 from separating from the base member 24 without having permanent deformation or damage to the plate 44 and strain gage assembly 48.

Figure 4:
FIG. 4 is an overhead view, partially cut-away, of the overload stop of FIG. 3.

One method for installing the fastener element 70 within the first track 28 is shown in FIG. 4. The opening 76 in the first track 28 could be formed as a slot 86 formed in one end of the track 28. The fastener element 70 would be slid into the slot 86 and then fastened into the base member 24 and positioned to form the specified gap size 80. The slot 86 is narrower than the diameter of the enlarged head portion 78 such that the head portion 78 prevents separation of the track assembly 26 from the base member 24 during overload forces F.

The plate 44 for the sensor assembly 32 can have any of various known shapes. One type of plate is shown in FIGS.

2–3, 5, and 6. In this embodiment, the plate 44 includes a center groove 66 on one side of the center body portion 46 with the strain gage assembly 48 being mounted on the opposite side. The groove 66 concentrates bending in the center body portion 46 to increase sensor accuracy. The gap 66 formed between the beam member 34 and center body portion 46 provides clearance for the strain gage assembly 48 and provides clearance for bending without damaging the sensor assembly 32.

Figure 5:
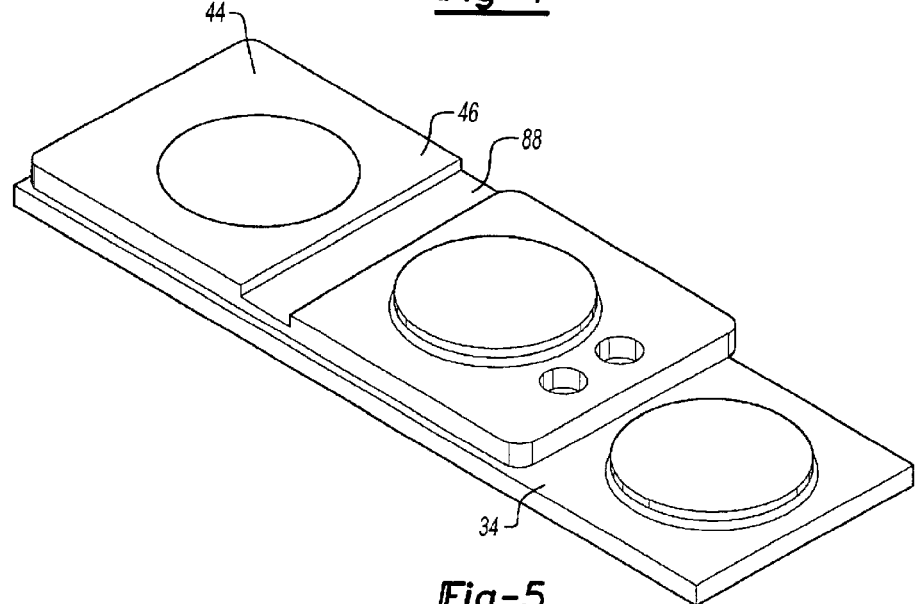
FIG. 5 is a perspective view of the weight sensor and beam member assembly shown in FIG. 2.
Figure 6:
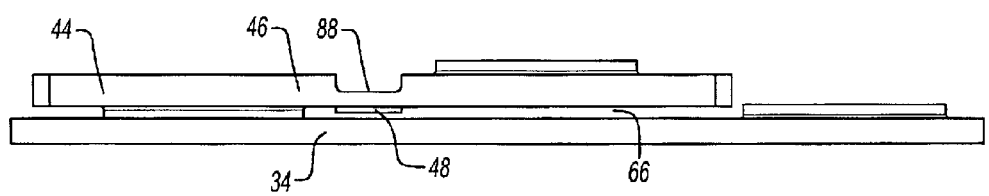
FIG. 6 is a side view of the assembly of FIG. 5.
Figure 7:
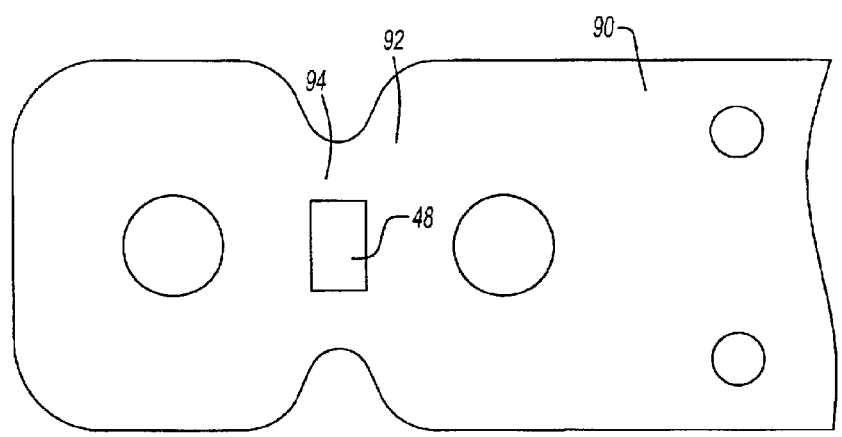
FIG. 7 is an alternate embodiment of a plate for the sensor assembly.

An alternate embodiment of a plate 90 is shown in FIG. 7. This plate 90 includes a center body portion 92 that has a neck section 94 that is narrower at the middle of the center body portion 92 than at the ends of the plate 90. This narrowing neck section 94 concentrates bending at the center body portion 92. The strain gage assembly 48 is mounted on the plate 90 at the neck section 94. It should be under stood that either the plate 44 shown in FIGS. 5–6 or the plate shown in FIG. 7 could be used with the bending beam 34 shown in FIGS. 2 and 3.

The subject invention provides for increased overall deflection for a given load cell sensor assembly 32. The increased deflection allows for the whole sensor assembly 32 to move and hit an overload stop 68 having a generous gap size 80 before the sensor assembly 32 experiences permanent deformation or has strain gage assembly 48 failure. This overcomes problems with prior sensor assemblies having small deflections and not being able to manufacture an overload stop with a gap size that is small enough resulting in sensor failure during overload force application. Specifically, these prior sensor assemblies yielded at a small deflection under overload applications. The overload stop gap was too large and could not be decreased in size because of the system tolerances. The subject weight sensor assembly 32 used in combination with the beam member 34 provides a secondary spring element in series with the sensor assembly 32 that provides increased deflection to work in conjunction with larger overload stop gap sizes. The secondary spring element has less stiffness than the plate member 44 of the sensor assembly 32. The allowable deflection of the spring element causes the system to hit the overload stop well before the yield points of both the plate 44 and the beam member 34.

Although a preferred embodiment of this invention has been disclosed, it should be understood that a worker of ordinary skill in the art would recognize many modifications come within the scope of this invention. For that reason, the following claims should be studied to determine the true scope and content of this invention.

We claim:

1. A system for measuring a weight on a vehicle seat while providing overload protection comprising:
   a seat assembly having a seat back and a seat bottom;
   a seat track assembly for mounting said seat assembly to a vehicle base member, said seat bottom being movable by said track assembly to provide horizontal seat adjustment;
   at least one sensor assembly mounted to said seat track assembly, said sensor assembly including a plate with a deflectable central body portion and at least one strain gage mounted on said central body portion for measuring strain resulting from a weight force being applied to said seat bottom; and
   a resilient beam member mounted between said plate and said vehicle base member, said beam member being deflectable in response to an overload force applied to said seat track assembly in a direction different than the direction of said weight force application to prevent failure of said sensor assembly.

2. A system according to claim 1 wherein said resilient beam member is a spring having a first spring end attached to said base member and a second spring end attached to said plate.

3. A system according to claim 2 wherein said plate has a first plate end mounted to said track assembly and a second plate end mounted to said second spring end.

4. A system according to claim 3 wherein said second spring end is constrained from downward deflection by said vehicle base member resulting in S-shaped bending in said central body portion due to said weight force.

5. A system according to claim 3 wherein said second spring and plate ends deflect upwardly away from said vehicle base member during an overload force application applied in a direction opposite to a weight force application.

6. A system according to claim 1 including a first gap formed between said central body portion of said plate and said track assembly and a second gap formed between said central body portion of said plate and said beam member.

7. A system according to claim 1 including an overload stop reacting between said track assembly and said vehicle base member to prevent separation of said seat assembly from said vehicle base member due to said overload force.

8. A system according to claim 7 wherein said track assembly includes a track opening having a first predetermined cross-sectional size and said overload stop comprises a fastener secured at one end to said vehicle base member with an opposite end extending through said track opening with an enlarged head portion having a second predetermined cross-sectional size greater than said first predetermined cross-sectional size wherein said track assembly engages said head portion during application of said overload force to prevent separation.

9. A system according to claim 8 including an overload gap formed between a bottom track surface and said head portion wherein said overload gap is at least three millimeters during weight force application and wherein said overload gap is eliminated during overload force application.

10. A system according to claim 1 wherein said vehicle base member includes a recess extending underneath said sensor assembly, said recess having a support surface against which said beam member reacts during weight force applications to prevent downward deflection of said beam member.

11. A weight sensor assembly with overload protection comprising:
   a plate having a first connection portion engageable with an upper seat structure and a second connection portion;
   a bendable central body portion extending between said first and second connection portions;
   a strain gage assembly mounted on said central body portion for measuring the strain resulting from a weight force application exerted against the upper seat structure; and
   a resilient beam mounted between said second connection portion of said plate and a vehicle base member, said beam member being deflectable to prevent failure of said sensor assembly in response to an overload force applied in an opposite direction to said weight force application.

12. An assembly according to claim 11 wherein said vehicle base member includes a recess extending underneath said plate, said recess having a support surface against which said beam member reacts during weight force applications to prevent downward deflection of said beam member.

13. An assembly according to claim 12 wherein said resilient beam member deflects upwardly away from said support surface in response to an overload force application to prevent permanent deformation of said plate or strain gage assembly failure.

14. An assembly according to claim 13 including an overload stop comprising a fastener attached at one end to said vehicle base member and extending to an opposite end that supports an enlarged head portion wherein said track assembly engages said head portion during overload force applications to prevent said seat from separating from said vehicle base member.

15. An assembly according to claim 14 wherein said resilient beam member is a spring having a first spring end attached to said base member and a second spring end attached to said plate with a spring body extending between said first and second spring ends, said spring body being spaced apart from said central body portion of said plate to define a gap.

16. A method for providing overload protection for a vehicle seat weight sensor assembly comprising the steps of:

mounting an upper seat structure to a vehicle base member;

mounting a plurality of weight sensors to the upper seat structure which bend in response to application of a weight force to the upper seat structure;

mounting a resilient beam member between each weight sensor and the vehicle base member; and deflecting the beam member and the weight sensors to prevent failure of the weight sensors in response to an overload force applied in a different direction than the direction of the weight force.

17. A method according to claim 16 including mounting one end of the beam member to the vehicle base member and an opposite end of the beam member to the weight sensor, and forming a gap between a center body portion of the beam member and a center body portion of the weight sensor.

18. A method according to claim 17 wherein the weight force is applied downwardly toward the vehicle base member and the overload force is applied upwardly away from the vehicle base member.

19. A method according to claim 18 including the step of preventing separation of the upper seat structure and the vehicle base member with an overload stop.

* * * * *